(12) United States Patent
Jang et al.

(10) Patent No.: US 12,038,669 B2
(45) Date of Patent: Jul. 16, 2024

(54) CAMERA MODULE

(71) Applicant: SAMSUNG ELECTRO-MECHANICS CO., LTD., Suwon-si (KR)

(72) Inventors: Su Bong Jang, Suwon-si (KR); Sang Jong Lee, Suwon-si (KR); Hee Soo Yoon, Suwon-si (KR); Tae Ho Yun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 502 days.

(21) Appl. No.: 17/397,172

(22) Filed: Aug. 9, 2021

(65) Prior Publication Data

US 2022/0163870 A1 May 26, 2022

(30) Foreign Application Priority Data

Nov. 23, 2020 (KR) .................. 10-2020-0157988

(51) Int. Cl.
*G03B 13/36* (2021.01)
*G02B 7/09* (2021.01)
(Continued)

(52) U.S. Cl.
CPC ............. *G03B 13/36* (2013.01); *G02B 7/09* (2013.01); *G02B 27/646* (2013.01); *G03B 5/04* (2013.01);
(Continued)

(58) Field of Classification Search
CPC ........ G02B 7/09; G02B 27/646; G03B 13/36; G03B 5/04; G03B 2205/0015; G03B 2205/0069; H04N 23/51; H04N 23/55
(Continued)

(56) References Cited

U.S. PATENT DOCUMENTS

2016/0025995 A1 1/2016 Ariji
2017/0038600 A1 2/2017 Hee et al.
(Continued)

FOREIGN PATENT DOCUMENTS

CN 104204934 A 12/2014
CN 108737723 A 11/2018
(Continued)

OTHER PUBLICATIONS

Chinese Office Action issued on Apr. 1, 2024, in counterpart of Chinese Patent Application No. 202111256504.6 (7 pages in English, 9 pages in Chinese).

*Primary Examiner* — Joseph P Martinez
*Assistant Examiner* — Grant A Gagnon
(74) *Attorney, Agent, or Firm* — NSIP Law

(57) ABSTRACT

A camera module includes: a lens module including a lens and movably disposed in a housing; a first displacement identification layer disposed on the lens module, configured to move according to movement of the lens module, and having a width varying according to coordinates in one direction in the lens module; and a second displacement identification layer disposed on the lens module, configured to move according to the movement of the lens module, and having a width varying according to the coordinates in the one direction in the lens module. The first and second displacement identification layers are arranged such that a coordinate, among the coordinates in the one direction, corresponding to a maximum width of the first displacement identification layer is different from a coordinate, among the coordinates in the one direction in the lens module, corresponding to a maximum width of the second displacement identification layer.

22 Claims, 9 Drawing Sheets

(51) Int. Cl.
    *G02B 27/64*     (2006.01)
    *G03B 5/04*     (2021.01)
    *H04N 23/51*     (2023.01)
    *H04N 23/55*     (2023.01)

(52) U.S. Cl.
    CPC ............... *G03B 2205/0015* (2013.01); *G03B 2205/0069* (2013.01); *H04N 23/51* (2023.01); *H04N 23/55* (2023.01)

(58) Field of Classification Search
    USPC ........................................................ 359/822
    See application file for complete search history.

(56) References Cited

U.S. PATENT DOCUMENTS

| | | |
|---|---|---|
| 2018/0128649 A1 | 5/2018 | Terajima |
| 2018/0299644 A1 | 10/2018 | Lee et al. |
| 2019/0094565 A1 | 3/2019 | Park et al. |
| 2020/0052621 A1 | 2/2020 | Yu et al. |

FOREIGN PATENT DOCUMENTS

| | | |
|---|---|---|
| CN | 109073957 A | 12/2018 |
| CN | 110830683 A | 2/2020 |
| JP | 2018-77223 A | 5/2018 |
| KR | 10-1717206 B1 | 3/2017 |

CAMERA MODULE

CROSS-REFERENCE TO RELATED APPLICATION(S)

This application claims the benefit under 35 U.S.C. § 119(a) of Korean Patent Application No. 10-2020-0157988 filed on Nov. 23, 2020 in the Korean Intellectual Property Office, the entire disclosure of which is incorporated herein by reference for all purposes.

BACKGROUND

1. Field

The following description relates to a camera module.

2. Description of Related Art

In general, in a portable communication terminal such as a mobile phone, a PDA, or a portable PC, it has recently become more common to transmit image data, in addition to text and voice data. In response to this trend, a camera module may be installed in the portable communication terminal, in order for such a terminal to be able to transmit image data, allow video chatting to be performed, or the like.

In general, a camera module included in a portable communication terminal may include a lens barrel having a lens therein and a housing accommodating the lens barrel, and may further include an image sensor configured to convert an image of a subject into an electrical signal. A camera module of a single focus method for capturing an image of an object by a fixed focus may be adopted as the camera module. However, recently, a camera module including an actuator capable of autofocusing (AF) control has been adopted. In addition, the camera module may employ an actuator for optical image stabilization (OIS) in order to alleviate a decrease in resolution due to hand shake.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a lens module including a lens and movably disposed in a housing; a first displacement identification layer disposed on the lens module, configured to move according to movement of the lens module, and having a width varying according to coordinates in one direction in the lens module; and a second displacement identification layer disposed on the lens module, configured to move according to the movement of the lens module, and having a width varying according to the coordinates in the one direction in the lens module. The first and second displacement identification layers are arranged such that a coordinate, among the coordinates in the one direction, corresponding to a maximum width of the first displacement identification layer is different from a coordinate, among the coordinates in the one direction in the lens module, corresponding to a maximum width of the second displacement identification layer.

One of the first and second displacement identification layers may have a plurality of maximum widths corresponding to different coordinates among the coordinates in the one direction in the lens module. A difference between the coordinate corresponding to the maximum width of the first displacement identification layer and the coordinate corresponding to the maximum width of the second displacement identification layer may be more than $\frac{1}{8}$ times and less than $\frac{3}{8}$ times a difference between coordinates in the one direction in the lens module corresponding to the plurality of maximum widths of the one of the first and second displacement identification layers.

A length of the first displacement identification layer may be one cycle or more in a period of the width of the first displacement identification layer. A length of the second displacement identification layer may be one cycle or more in a period of the width of the second displacement identification layer.

A shape of the first displacement identification layer may be identical to a shape of the second displacement identification layer. The difference between the coordinate corresponding to the maximum width of the first displacement identification layer and the coordinate corresponding to the maximum width of the second displacement identification layer may be $\frac{1}{4}$ times a period of the width of the first displacement identification layer.

Each of the first and second displacement identification layers may have a sinusoidal wave-shaped boundary line.

A change rate of a width of each of the first and second displacement identification layers according to the coordinates in the one direction may change according to the coordinates in the one direction in the lens module.

Each of the first and second displacement identification layers may include any one or any combination of any two or more of copper, silver, gold, and aluminum.

The camera module may further include an identification layer support member disposed to move according to the movement of the lens module and having one surface on which the first and second displacement identification layers are disposed.

The camera module may further include a plurality of sensing coils arranged such that inductance is changed according to movement of a corresponding displacement identification layer, among the first and second displacement identification layers, in the one direction.

The camera module may further include at least one sensing coil arranged such that inductance is changed according to movement of the first and second displacement identification layers in the one direction, in the housing. At least a portion of the at least one sensing coil may be disposed to overlap at least a portion of each of the first and second displacement identification layers in a normal direction of one surface of the first and second displacement identification layers.

The camera module may further include: a substrate disposed in the housing, the at least one sensing coil being disposed on the substrate; a magnet disposed to move according to the movement of the lens module; and a driving coil configured to output a magnetic flux driving the magnet in the housing, and disposed on a portion of the substrate different from a portion of the substrate on which the at least one sensing coil is disposed.

A size of one sensing coil among the at least one sensing coil may be smaller than a size of the driving coil.

The camera may further include: a third displacement identification layer disposed on the lens module, configured to move according to the movement of the lens module, and having a width varying according to coordinates in a second direction in the lens module; and a fourth displacement identification layer disposed on the lens module, configured to move according to the movement of the lens module, and having a width varying according to the coordinates in the second direction in the lens module. The third and fourth displacement identification layers may be arranged such that a coordinate, among the coordinates in the second direction, corresponding to a maximum width of the third displacement identification layer is different from a coordinate, among the coordinates in the second direction, corresponding to a maximum width of the fourth displacement identification layer. The one direction may be a first direction different from the second direction.

The camera module may further include: a fifth displacement identification layer disposed on the lens module, configured to move according to the movement of the lens module, and having a width varying according to coordinates in a third direction different from the first and second directions in the lens module; and a sixth displacement identification layer disposed on the lens module, configured to move according to movement of the lens module, and having a width varying according to the coordinates in the third direction in the lens module. The fifth and sixth displacement identification layers may be arranged such that a coordinate, among the coordinates in the third direction, corresponding to a maximum width of the fifth displacement identification layer is different from a coordinate, among the coordinates in the third direction, corresponding to a maximum width of the sixth displacement identification layer.

One of the first, second, and third directions may be an optical axis direction of the lens module, and others of the first, second, and third directions may be perpendicular to the optical axis direction and perpendicular to each other.

The first and second displacement identification layers may be arranged such that a separation distance between the first and second displacement identification layers is shorter than a separation distance from the first and second displacement identification layers to the third and fourth displacement identification layers.

In another general aspect, a camera module includes: a frame; a lens barrel disposed in the frame; a first displacement identification layer disposed on the frame and having a width varying along one direction; and a second displacement identification layer disposed on the frame and having a width varying along the one direction differently than the width of the first displacement identification layer varies along the one direction.

The first and second displacement identification layers may be arranged such that a maximum width of the first displacement identification layer and a maximum width of the second displacement identification layer are disposed at different respective positions in the one direction.

Each of the first and second displacement identification layers may have a wave-shaped boundary line extending in the one direction.

The first and second displacement identification layers may be arranged such that a minimum width of the first displacement identification layer and a minimum width of the second displacement identification layer are disposed at different respective positions in the one direction.

The one direction may be a direction parallel to an optical axis of the lens barrel, or a direction perpendicular to the optical axis.

The first and second displacement identification layers may be configured to change an inductance of at least one sensing coil based on movement of the first and second displacement identification layers.

Other features and aspects will be apparent from the following detailed description, the drawings, and the claims.

Figure 1:
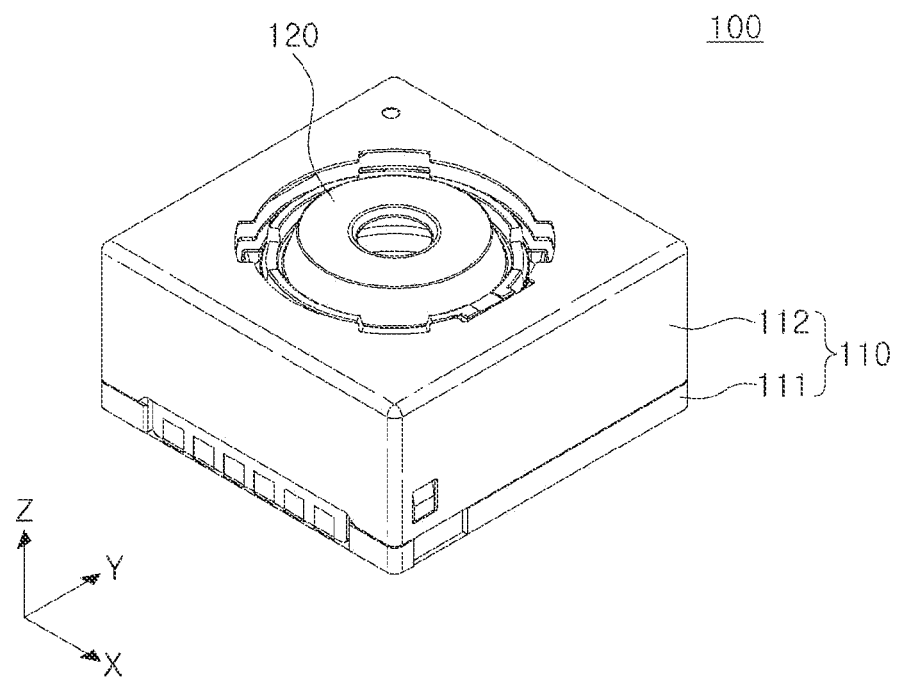
FIG. 1 is a combined perspective view of a camera module, according to an embodiment.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after an understanding of this disclosure. Further, although the examples described herein have a variety of configurations, other configurations are possible as will be apparent after an understanding of this disclosure.

FIG. 1 is a combined perspective view of a camera module, according to an embodiment.

Referring to FIG. 1, a camera module 100 may include a housing unit 110 and a lens barrel 120. The housing unit 110 may include a housing 111 and a shield case 112. The camera module 100 may include at least one of an autofocusing control function or an optical image stabilization function. For example, in order for the camera module 100 to perform the autofocusing control function and the optical image stabilization function, the lens barrel 120 may move in the housing unit 110 in an optical axis direction and in a direction perpendicular to the optical axis direction, respectively.

Figure 2:
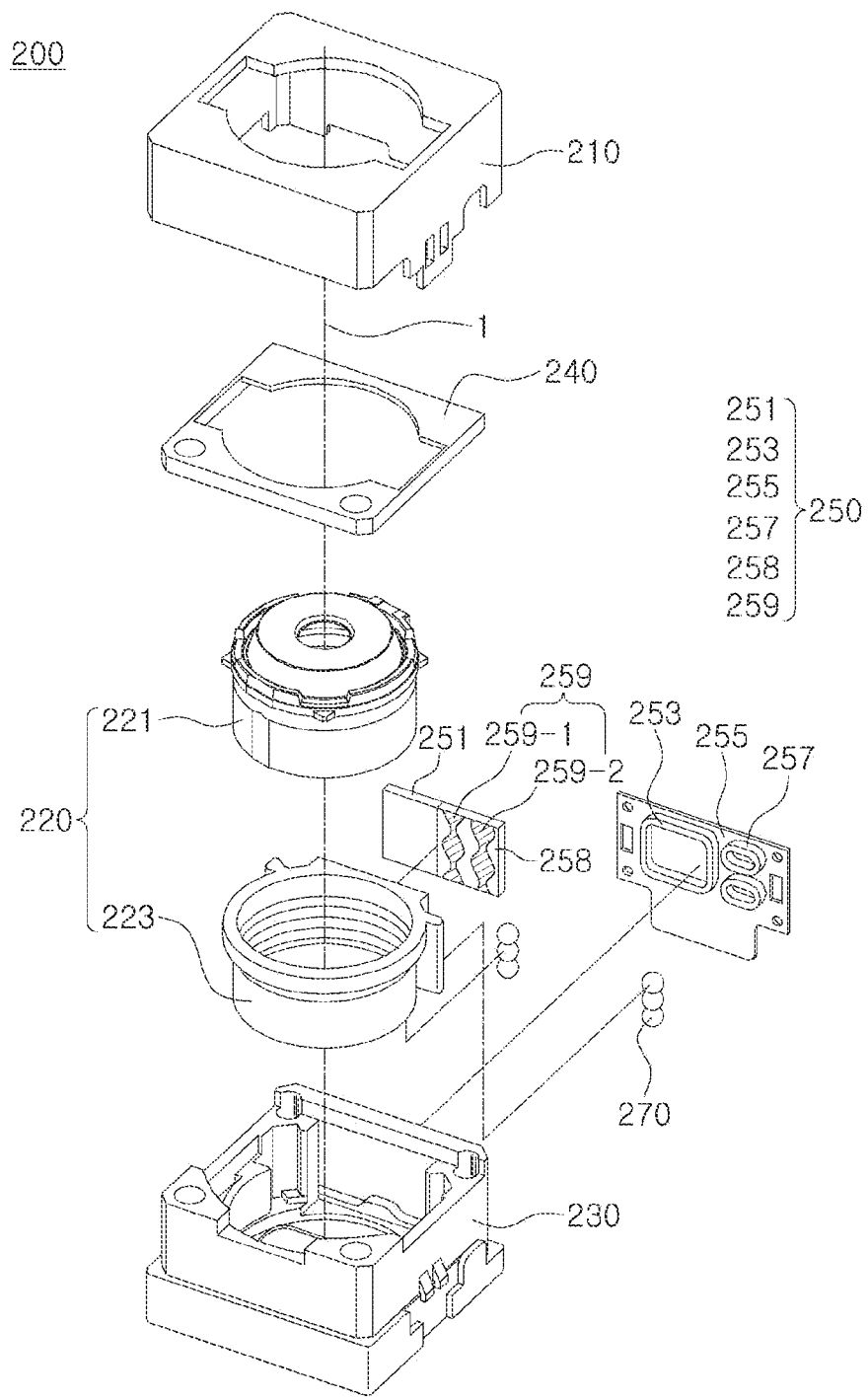
FIG. 2 is an exploded perspective view of a camera module, according to an embodiment.

FIG. 2 is an exploded perspective view of a camera module, according to an embodiment.

Referring to FIG. 2, a camera module 200 may include a shield case 210, a lens module 220, a housing 230, a stopper 240, an actuator 250, and a ball bearing unit 270.

The lens module 220 may include a lens barrel 221 and a lens holder 223 accommodating the lens barrel 221 therein.

The lens barrel 221 may have a hollow cylindrical shape such that a plurality of lenses capturing an image of a subject are accommodated therein, and the plurality of lenses may be provided in the lens barrel 221 so as to be stacked in an optical axis direction 1. The plurality of lenses may any number of lenses necessary according to a design of the lens module 220, and may have optical characteristics such as the same or different refractive indices, or the like.

The lens barrel 221 may be coupled to the lens holder 223. For example, the lens barrel 221 may be inserted into a hollow formed in the lens holder 223, and the lens barrel 221 and the lens holder 223 may be coupled to each other by a screw connection method or through an adhesive. The lens module 220 may be accommodated in the housing 230, and may be moved for autofocusing control in the optical axis direction 1.

The actuator 250 may drive the lens module 220 in the optical axis direction 1. In order to move the lens module 220 in the optical axis direction 1, the actuator 250 may include a magnet 251 mounted on one side of the lens holder 223, and a driving coil 253 disposed to oppose the magnet 251. The driving coil 253 may be mounted on a substrate 255, and the substrate 255 may be mounted on the housing 230 such that the driving coil 253 opposes the magnet 251.

The actuator 250 may apply a driving signal to the driving coil 253. The actuator 250 may include an H bridge circuit capable of driving in two directions, and may apply a driving signal to the driving coil 253 by a voice coil motor method.

The actuator 250 may apply a driving signal to the driving coil 253, to move the lens module 220 in the optical axis direction 1. Specifically, the actuator 250 may apply a driving signal to the driving coil 253, to provide driving force to the magnet 251, and the lens module 220 may be moved in the optical axis direction 1 by the driving force of the magnet 251. When a driving signal is provided to the driving coil 253, magnetic flux may be generated in the driving coil 253. The magnetic flux of the driving coil 253 may interact with a magnetic field of the magnet 251 to generate driving force for moving the module 220 in the optical axis direction 1 according to Fleming's left-hand rule.

The magnet 251 may include a first magnetic body and a second magnetic body. The first magnet and the second magnet may be formed by polarizing the magnet 251, and, accordingly, the lens module 220 may be easily moved. The magnet 251 may be used for the actuator 250 to detect a position of the lens module 220.

The actuator 250 may include a sensing coil 257 mounted on the substrate 255 to oppose a displacement identification layer 259. The sensing coil 257 may be disposed outside the driving coil 253, and as illustrated in FIG. 2, the sensing coil 257 may include at least one coil.

Inductance of the sensing coil 257 may be changed according to a change in position of the displacement identification layer 259. Specifically, when the displacement identification layer 259 moves in one direction, a magnitude of eddy current of the displacement identification layer 259 affecting the inductance of the sensing coil 257 may be changed, and intensity of a magnetic field according to the eddy current may be changed. Therefore, the inductance of the sensing coil 257 may be changed.

The actuator 250 may determine displacement of the lens module 220 from a change in inductance of the sensing coil 257. For example, the actuator 250 may additionally include at least one capacitor. The at least one capacitor and the sensing coil 257 may form a predetermined oscillation circuit. For example, the at least one capacitor may include a number of capacitors corresponding to the number of the sensing coils 257, and one capacitor and one sensing coil 257 may be configured in the same form as a predetermined LC oscillator. In addition, the at least one capacitor and the sensing coil 257 may be configured in the same widely known form as a Colpitts oscillator.

The actuator 250 may determine displacement of the lens module 220 from a change in frequency of an oscillation signal generated by the oscillation circuit. Specifically, when inductance of the sensing coil 257 forming the oscillation circuit is changed, since frequency of the oscillation signal generated by the oscillation circuit may be changed, the displacement of the lens module 220 may be detected based on the change in frequency.

The ball bearing unit 270 may be provided as a guide means for guiding the movement of the lens module 220 when the lens module 220 moves in the housing 230 in the optical axis direction 1. The ball bearing unit 270 may include one or more ball bearings. When the ball bearing unit 270 includes a plurality of ball bearings, the plurality of ball bearings may be disposed (e.g., aligned) in the optical axis direction 1. The ball bearing unit 270 may be in contact with an outer surface of the lens holder 223 and an inner surface of the housing 230, to guide the movement of the lens module 220 in the optical axis direction 1. For example, the ball bearing unit 270 may be disposed between the lens holder 223 and the housing 230, and may guide the movement of the lens module 220 in the optical axis direction through a rolling motion.

The stopper 240 may be mounted on the housing 230 to limit a moving distance of the lens module 220. For example, the stopper 240 may be mounted in an internal space formed by an upper portion of the housing 230, and the stopper 240 and the lens module 220 may be arranged to be spaced apart in the optical axis direction when power is not applied to the driving coil 253. Therefore, when power is applied to the driving coil 253 to move the lens module 220 in the optical axis direction, the moving distance of the lens module 220 may be limited by the stopper 240. In this case, the lens module 220 may be moved within a distance with the stopper 240. The stopper 240 may be made of a material having elasticity, to alleviate impacts when the stopper 240 and the lens module 220 collide with each other.

The shield case 210 may be coupled to the housing 230 to surround an outer surface of the housing 230, and may function to shield electromagnetic waves generated during driving of the camera module 200.

When the camera module is driven, electromagnetic waves are generated. When the electromagnetic waves are emitted externally, other electronic components may be affected, thereby causing communication failure or malfunction. To prevent this, the shield case 210 may be made of a metal material, and may be grounded to a ground pad of a substrate mounted in an internal space formed by a lower portion of the housing 230, to shield the electromagnetic waves. When a plastic injection product is provided as the shield case 210, a conductive paint may be applied to an inner surface of the shield case 210 to shield the electromagnetic waves. Conductive epoxy may be used as the conductive paint, but the conductive paint is not limited to conductive epoxy. Various materials having conductivity may be used for the conductive paint, and a method of attaching a conductive film or a conductive tape to the inner surface of the shield case 210 is also possible.

Figure 3:
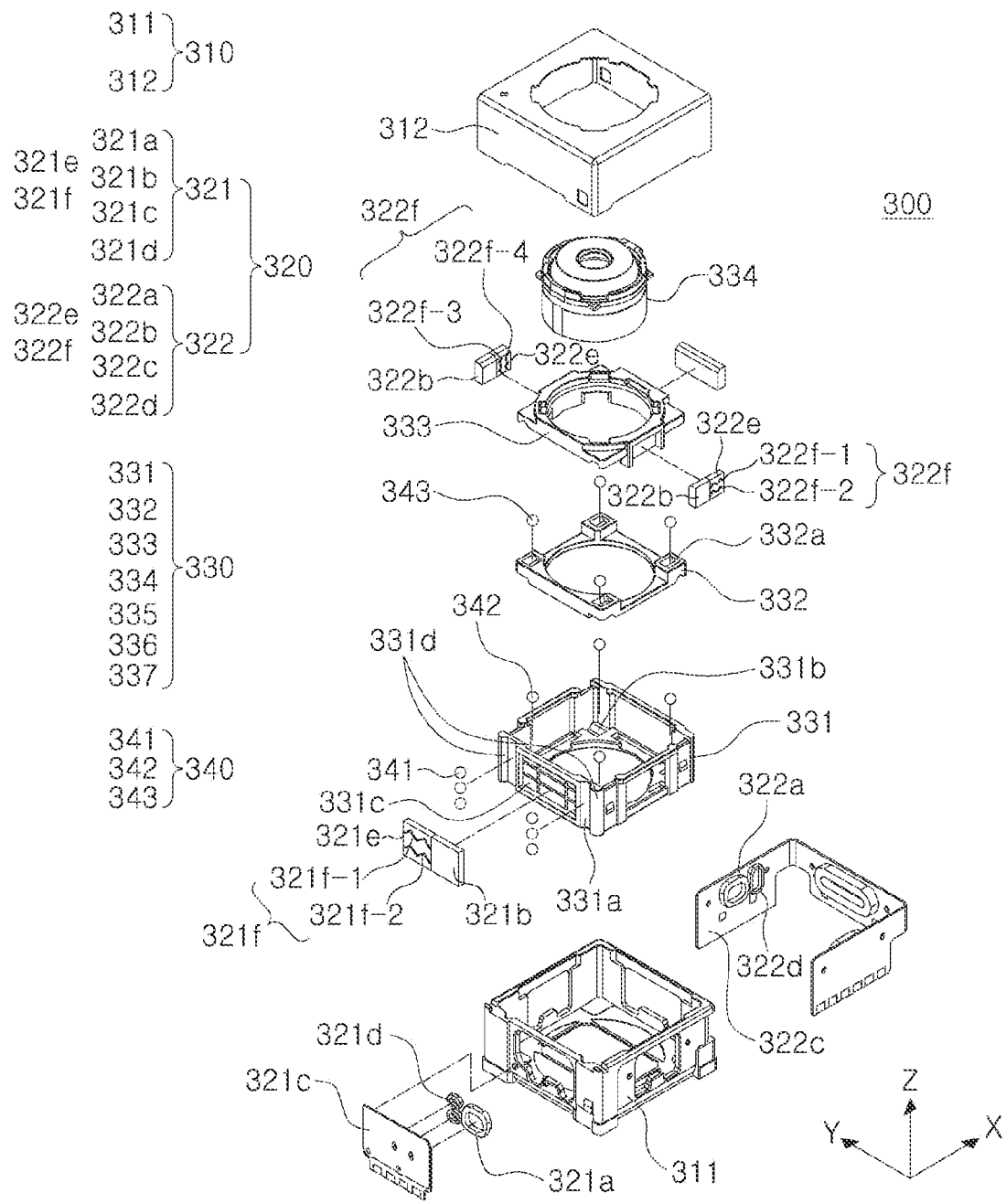
FIG. 3 is an exploded perspective view of a camera module, according to an embodiment.

FIG. 3 is an exploded perspective view of a camera module, according to an embodiment.

Referring to FIG. 3, a camera module 300 may include a housing unit 310, an actuator unit 320, and a lens module 330.

The housing unit 310 may include a housing 311 and a shield case 312. The housing 311 may be made of a material that may be easily molded. For example, the housing 311 may be made of a plastic material. One or more actuator units 320 may be mounted on the housing 311. For example, a portion of a first actuator 321 may be mounted on a first side surface of the housing 311, and a portion of a second actuator 322 may be mounted on second to fourth side surfaces of the housing 311. The housing 311 may be configured to accommodate the lens module 330 therein. For example, a space in which the lens module 330 is fully or partially accommodated may be formed in the housing 311.

The housing 311 may be in a form in which six surfaces are open. For example, a hole for mounting an image sensor may be formed on a lower surface of the housing 311, and a hole for mounting the lens module 330 may be formed on an upper surface of the housing 311. In addition, a hole into which a first driving coil 321a of the first actuator 321 is inserted may be formed on the first side surface of the housing 311, and a hole into which a second driving coil 322a of the second actuator 322 is inserted may be formed on the second to fourth side surfaces of the housing 311.

The shield case 312 may be configured to cover a portion of the housing 311. For example, the shield case 312 may be configured to cover the upper surface and the four side surfaces of the housing 311. In other examples, the shield case 312 may be configured to cover only the four side surfaces of the housing 311, or the shield case 312 may be configured to partially cover the upper surface and the four side surfaces of the housing 311.

The actuator unit 320 may include a plurality of actuators. For example, the actuator unit 320 may include the first actuator 321 configured to move the lens module 330 in a Z-axis direction, and the second actuator 322 configured to move the lens module 330 in an X-axis direction and a Y-axis direction.

The first actuator 321 may be mounted on the housing 311 and a first frame 331 of the lens module 330. For example, a portion of the first actuator 321 may be mounted on the first side surface of the housing 311, and remaining portions of the first actuator 321 may be mounted on a first side surface of the first frame 331. The first actuator 321 may move the lens module 330 in the optical axis direction (the Z-axis direction in FIG. 3). For example, the first actuator 321 may include a first driving coil 321a, a first magnet 321b, a first substrate 321c, and at least one sensing coil 321d. The first driving coil 321a and the at least one sensing coil 321d may be formed on the first substrate 321c. The first substrate 321c may be mounted on the first side surface of the housing 311, and the first magnet 321b may be mounted on the first side surface of the first frame 331 to oppose the first substrate 321c.

The first actuator 321 may apply a driving signal to the first driving coil 321a. The first actuator 321 may include an H bridge circuit capable of driving in two directions, and may apply a driving signal to the first driving coil 321a by a voice coil motor method. When the driving signal is applied to the first driving coil 321a, magnetic flux may be generated in the first driving coil 321a. The magnetic flux of the first driving coil 321a may interact with a magnetic field of the first magnet 321b to generate driving force for relative movement of the first frame 331 and a lens barrel 334 with respect to the housing 311. The first actuator 321, similar to the actuator 250 of FIG. 2, may determine displacement of the lens barrel 334 and the first frame 331 from a change in inductance of at least one sensing coil 321d. As illustrated, the first magnet 321b may be disposed on one surface 331c of the first frame 331. In another example, the first magnet 321b may be disposed on one of corners 331d of the first frame 331.

The second actuator 322 may be mounted on the housing 311 and a third frame 333 of the lens module 330. For example, a portion of the second actuator 322 may be mounted on the second to fourth side surfaces of the housing 311, and remaining portions of the second actuator 322 may be mounted on second to fourth side surfaces of the third frame 333. Alternatively, the second actuator 322 may be mounted on second to fourth corners with which the housing 311 and first to fourth side surfaces of the third frame 333 are in contact. In the above description, it has been described that the second actuator 322 may be formed on both the second to fourth side surfaces of the third frame 333 or the second to fourth corners, but actuators formed on each of the side surfaces or each of the corners may independently provide driving force to the lens module 330. Therefore, the second actuator 322 may be formed on a portion of the second to fourth side surfaces of the third frame 333, depending on an embodiment. Hereinafter, for convenience of description, it may be assumed that the actuator formed on the second side surface may be the second actuator 322. However, it is to be understood that the following description may be applied to actuators formed on different side surfaces or at different corners.

The second actuator 322 may move the lens module 330 in a direction perpendicular to the optical axis direction. For example, the second actuator 322 may include a second driving coil 322a, a second magnet 322b, a second substrate 322c, and at least one sensing coil 322d. The second driving coil 322a and the at least one sensing coil 322d may be formed on the second substrate 322c. The second substrate 322c may be generally formed to have a U shape, and may be mounted to surround the second to fourth side surfaces of the housing 311. The second magnet 322b may be mounted on the second side surface of the third frame 333 to oppose the second substrate 322c.

The second actuator 322 may change a magnitude and a direction of magnetic force generated between the second driving coil 322a and the second magnet 322b to enable relative movement of the second frame 332 or the third frame 333 with respect to the first frame 331. The lens barrel 334 may move in the same direction as the second frame 332 or the third frame 333 by movement of the second frame 332 or the third frame 333.

The second actuator 322 may detect a position of the second frame 332 or the third frame 333 from a change in inductance of the at least one sensing coil 322d, similarly to the actuator 250 of FIG. 2.

The lens module 330 may be mounted on the housing unit 310. For example, the lens module 330 may be accommodated in a storage space formed by the housing 311 and the shield case 312 so as to be movable in at least three axis directions.

The lens module 330 may include a plurality of frames. For example, the lens module 330 may include the first frame 331, the second frame 332, and the third frame 333. The first frame 331 may be movable with respect to the housing 311. For example, the first frame 331 may be moved in the optical axis direction (the Z-axis direction) of the housing 311 by the first actuator 321 described above. A plurality of guide grooves 331a and 331b may be formed in the first frame 331. For example, a first guide groove 331a extending lengthwise in the optical axis direction (the Z-axis direction) may be formed on the first side surface of the first frame 331, and a second guide groove 331b extending lengthwise in a first direction (the Y-axis direction), perpendicular to the optical axis direction, may be inwardly formed on four corners of a lower surface of the first frame 331. The first frame 331 may be manufactured to have a form in which at least three side surfaces are open. For example, second to fourth side surfaces of the first frame 331 may be opened such that the second magnet 322b of the third frame 333 and the second driving coil 322a of the housing 311 oppose each other.

The second frame 332 may be mounted on the first frame 331. For example, the second frame 332 may be mounted in an internal space formed by the first frame 331. The second frame 332 may move in the first direction (the Y-axis direction), perpendicular to the optical axis direction, with respect to the first frame 331. For example, the second frame 332 may move in the first direction (the Y-axis direction), perpendicular to the optical axis direction, along the second guide groove 331b of the first frame 331. A plurality of third guide grooves 332a may be formed in the second frame 332. For example, four third guide grooves 332a, extending in a second direction (the X-axis direction) perpendicular to the optical axis direction, may be formed at the corners of the second frame 332.

The third frame 333 may be mounted on the second frame 332. For example, the third frame 333 may be mounted on the upper surface of the second frame 332. The third frame 333 may be configured to move in the second direction (the X-axis direction), perpendicular to the optical axis direction, with respect to the second frame 332. For example, the third frame 333 may move in the second direction (the X-axis direction), perpendicular to the optical axis direction, along the third guide groove 332a of the second frame 332. A plurality of second magnets 322b may be mounted on the third frame 333. For example, at least two second magnets 322b may be mounted on second to fourth side surfaces of the third frame 333, respectively. For example, three second magnets 322b may be mounted on the second to fourth side surfaces of the third frame 333, respectively.

The third frame 333 described above may be integrally formed with the second frame 332. In this case, the third frame 333 may be omitted, and the second frame 332 may move in the first direction (the Y-axis direction) and the second direction (the X-axis direction), perpendicular to the optical axis direction.

The lens module 330 may include the lens barrel 334. For example, the lens barrel 334 may include one or more lenses. The lens barrel 334 may be mounted on the third frame 333. For example, the lens barrel 334 may be inserted into the third frame 333, and may move integrally with the third frame 333. The lens barrel 334 may move in the optical axis direction (the Z-axis direction) and in directions (the X-axis and Y-axis directions), perpendicular to the optical axis direction. For example, the lens barrel 334 may be moved in the optical axis direction (the Z-axis direction) by the first actuator 321, and may be moved in directions (X-axis and Y-axis direction), perpendicular to the optical axis direction, by the second actuator 322.

A ball bearing unit 340 may guide movement of the lens module 330. For example, the ball bearing unit 340 may be configured to allow the lens module 330 to smoothly move in the optical axis direction and in a direction perpendicular to the optical axis direction. The ball bearing unit 340 may include a first ball bearing 341, a second ball bearing 342, and a third ball bearing 343. For example, the first ball bearing 341 may be disposed in the first guide groove 331a of the first frame 331, such that the first frame 331 may smoothly move in the optical axis direction. As another example, the second ball bearing 342 may be disposed in the second guide groove 331b of the first frame 331, such that the second frame 332 may smoothly move in the first direction, perpendicular to the optical axis direction. As another example, the third ball bearing 343 may be disposed in the third guide groove 332a of the second frame 332, such that the third frame 333 may smoothly move in the second direction, perpendicular to the optical axis direction.

In an example, the first ball bearings 341 may include four ball bearings 341, and the second ball bearing 342 may include four second ball bearings 342. Each of the first ball bearings 341 may include at least three balls, and the at least three balls of each the first ball bearings 341 may be disposed in the first guide grooves 331a, respectively. Additionally, each of the second ball bearings 342 may include one or more balls, and the one or more balls of each of the second ball bearings 342 may be disposed in the second guide grooves 331b, respectively.

A lubricating material for reducing friction and noise may be filled in all portions in which the ball bearing unit 340 is disposed. For example, a viscous fluid may be injected into each of the guide grooves 331a, 331b, and 332a. A grease having excellent viscosity and lubrication properties may be used as the viscous fluid.

Figure 4A:
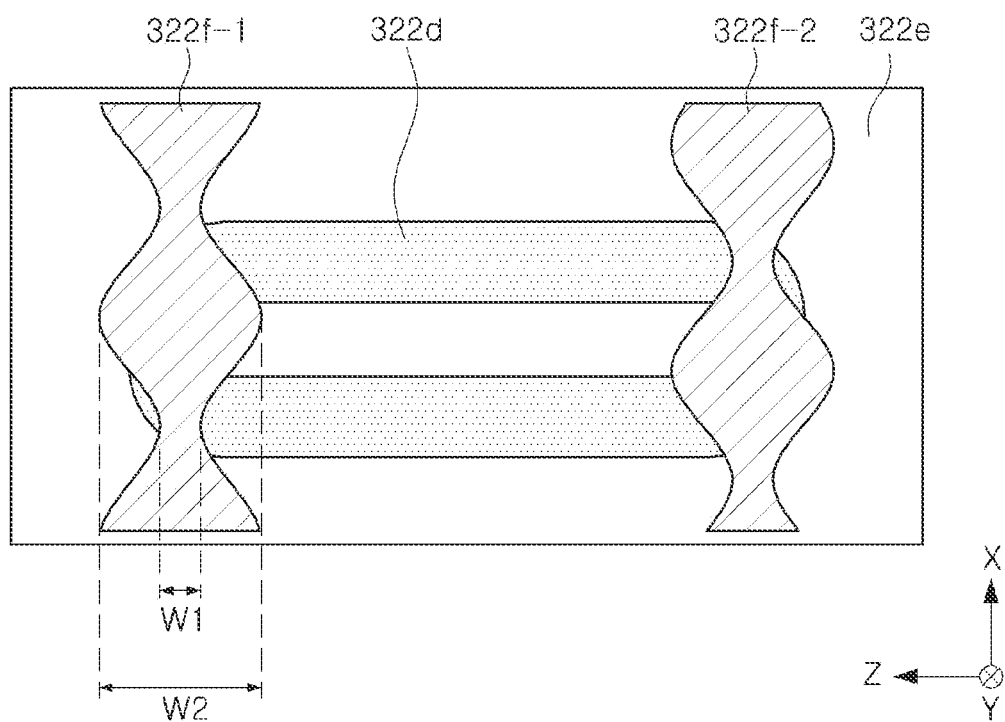
FIG. 4A is an enlarged view of a displacement identification layer of a camera module, according to an embodiment.
Figure 4B:
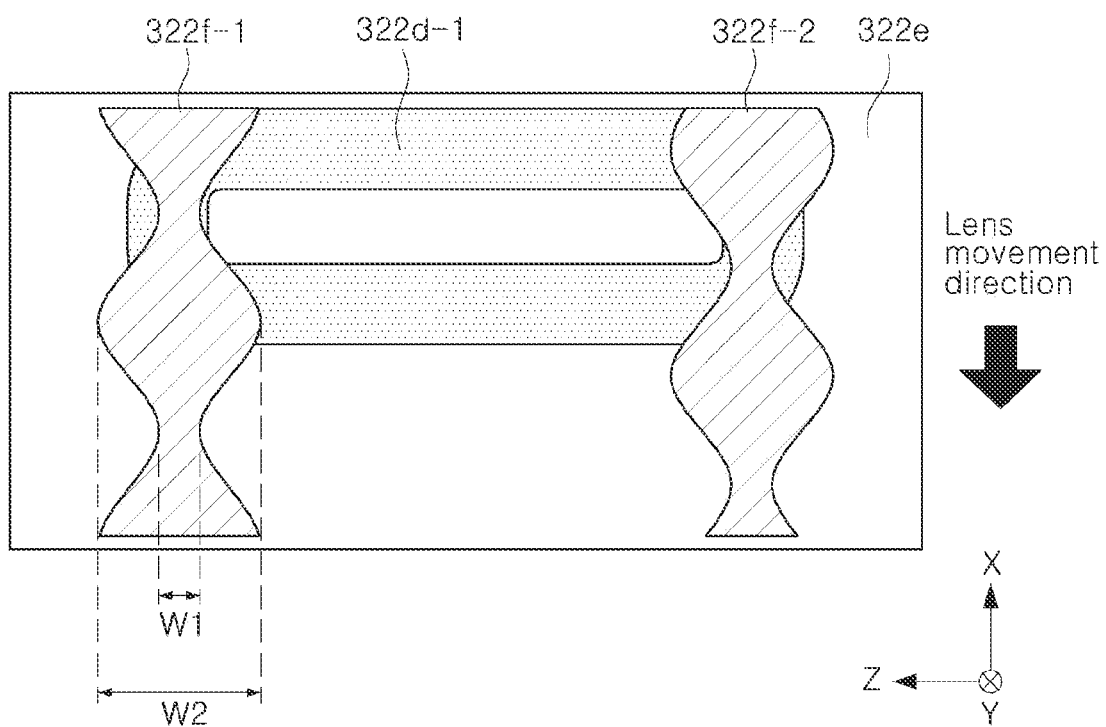
FIGS. 4B and 4C are views illustrating a change in a positional relationship between a displacement identification layer and a sensing coil, according to movement of a lens module of a camera module, according to an embodiment.
Figure 4C:
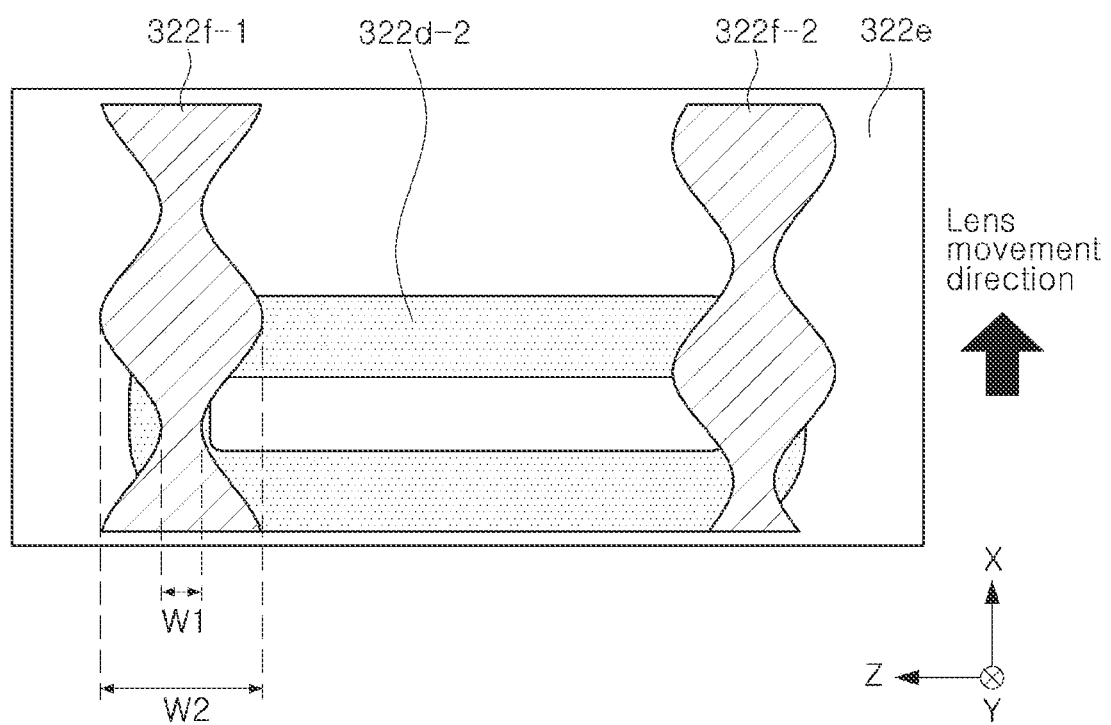

FIG. 4A is an enlarged view of a displacement identification layer of a camera module, according to an embodiment. FIGS. 4B and 4C are views illustrating a change in a positional relationship between a displacement identification layer and a sensing coil, according to movement of a lens module of a camera module, according to an embodiment.

Referring to FIGS. 4A to 4C, a camera module may include a first displacement identification layer 322f-1 and a second displacement identification layer 322f-2.

Each of the first and second displacement identification layers 322f-1 and 322f-2 may be disposed to move according to lens movement, and may have a width varying according to a coordinate in one direction (e.g., the X-direction) in a lens module.

An eddy current that may be formed in each of the first and second displacement identification layers 322f-1 and 322f-2 may flow in a direction surrounding a portion of each of the first and second displacement identification layers 322f-1 and 322f-2, overlapping a central portion of the sensing coil 322d in the Y-direction. Each of the first and second displacement identification layers 322f-1 and 322f-2 may output magnetic flux due to the respective eddy current. A magnitude of the eddy current and a magnitude of the magnetic flux may be dependent on each other.

A magnitude of eddy current that may be formed in each of the first and second displacement identification layers 322f-1 and 322f-2 may be dependent on a width of the portion of each of the first and second displacement identification layers 322f-1 and 322f-2, overlapping the central portion of the sensing coil 322d in the Y-direction. Since the central portion of the sensing coil 322d may move in the X-direction, in view of the first and second displacement identification layers 322f-1 and 322f-2, a magnitude of eddy current that may be formed in each of the first and second displacement identification layers 322f-1 and 322f-2 may be dependent on relative movement of the sensing coil 322d or movement of the lens module in the X-direction.

Inductance of the sensing coil 322d may be a sum of or a difference in mutual inductance due to the magnetic flux and self inductance of the sensing coil 322d, and may be thus changed according to a magnitude of magnetic flux caused by the eddy current. Movement of the lens module (lens movement) may be detected, based on inductance of the sensing coil 322d.

As a magnitude of eddy current of each of the first and second displacement identification layers 322f-1 and 322f-2 may be linearly changed according to lens movement displacement, the lens movement may be more precisely sensed.

The first and second displacement identification layers 322f-1 and 322f-2 may be arranged such that a coordinate in one direction (e.g., the X-direction) of the lens module corresponding to a maximum width (e.g., a maximum width in the Z-direction (optical axis direction)) of the first displacement identification layer 322f-1 is different from a coordinate in the one direction (e.g., the X-direction) of the lens module corresponding to a maximum width (e.g., a maximum width in the Z-direction) of the second displacement identification layer 322f-2. For example, a coordinate in the X-direction corresponding to a minimum width W1 of the first displacement identification layer 322f-1 may be different from a coordinate in the X-direction corresponding to a minimum width of the second displacement identification layer 322f-2. A coordinate in the X-direction corresponding to a maximum width W2 of the first displacement identification layer 322f-1 may be different from a coordinate in the X-direction corresponding to a maximum width of the second displacement identification layer 322f-2.

Therefore, an effect of the first displacement identification layer 322f-1 according to one direction displacement in a pattern of changing a magnitude of eddy current of the first displacement identification layer 322f-1 according to relative movement of the first displacement identification layer 322f-1, and an effect of the second displacement identification layer 322f-2 according to one direction displacement in a pattern of changing a magnitude of eddy current of the second displacement identification layer 322f-2 according to relative movement of the second displacement identification layer 322f-2 may be complementary to each other.

Therefore, inductance of the sensing coil 322d may be more stably changed, depending on integration of a factor of changing inductance according to a change in magnitude of eddy current of the first displacement identification layer 322f-1 and a factor of changing inductance according to a change in magnitude of eddy current of the second displacement identification layer 322f-2. In a camera module according to an embodiment of this disclosure, movement of a lens module may be detected more stably, accurately, linearly, and/or efficiently.

According to a design, the sensing coil 322d may be composed of a plurality of sensing coils to which a factor of changing inductance according to a change in magnitude of eddy current of the first displacement identification layer 322f-1 and a factor of changing inductance according to a change in magnitude of eddy current of the second displacement identification layer 322f-2 are applied, respectively.

In addition to generation of information on the lens movement, inductance of each of the plurality of sensing coils may be used. Therefore, a factor of changing inductance according to a change in magnitude of eddy current of the first displacement identification layer 322f-1 and a factor of changing inductance according to a change in magnitude of eddy current of the second displacement identification layer 322*f*-2 may be used in an integrated manner. A camera module according to an embodiment of this disclosure may more linearly detect the lens movement. For example, the camera module may more linearly detect the lens movement and may have a longer range of one direction linear detection, as compared to a structure detecting movement of the lens module using a hall sensor.

For example, one of the first and second displacement identification layers 322*f*-1 and 322*f*-2 may have a plurality of maximum widths W2 corresponding to different coordinates in the one direction. A difference between a coordinate in the one direction (e.g., the X-direction) of the lens module corresponding to a maximum width of the first displacement identification layer 322*f*-1 and a coordinate in the one direction (e.g., the X-direction) of the lens module corresponding to a maximum width of the second displacement identification layer 322*f*-2 may be more than ⅛ times and less than ⅜ times a difference between coordinates in the one direction corresponding to the plurality of maximum widths of one of the first and second displacement identification layers 322*f*-1 and 322*f*-2 (for example, a period of a width of one of the first and second displacement identification layers in the X-direction). When the period of the width of one of the first and second displacement identification layers 322*f*-1 and 322*f*-2 in the X-direction corresponds to a phase of 360 degrees, a difference in phase between the first and second displacement identification layers 322*f*-1 and 322*f*-2 may be greater than 45 degrees and less than 135 degrees.

Therefore, inductance of each of the plurality of sensing coils may be applied to an arctangent function as a denominator and a numerator, respectively, and an output value of the arctangent function may be more linear (substantially constant change rate) with respect to the lens movement.

For example, an X-direction length of the first displacement identification layer 322*f*-1 may be one cycle or more in a period of the width of the first displacement identification layer 322*f*-1, and an X-direction length of the second displacement identification layer 322*f*-2 may be one cycle or more in a period of the width of the second displacement identification layer 322*f*-2. A width of each of the first and second displacement identification layers 322*f*-1 and 322*f*-2 may be repeated every one cycle. The X-direction length of the period of the width of each of the first and second displacement identification layers 322*f*-1 and 322*f*-2 may be changed according to a sensation range of the lens movement.

For example, shapes of the first and second displacement identification layers 322*f*-1 and 322*f*-2 may be identical to each other, and a difference between a coordinate in the one direction (e.g., the X-direction) of the lens module corresponding to a maximum width of the first displacement identification layer 322*f*-1 and a coordinate in the one direction (e.g., the X-direction) of the lens module corresponding to a maximum width of the second displacement identification layer 322*f*-2 may be ¼ times a period of the width of the first displacement identification layer 322*f*-1 (corresponding to a difference in 90 degree phase). Therefore, a change in output value of an arctangent function in which inductance of each of the plurality of sensing coils are applied as a denominator and a numerator may be most linear with respect to the lens movement.

For example, a change rate of a width of each of the first and second displacement identification layers 322*f*-1 and 322*f*-2 according to a coordinate in the one direction (e.g., the X-direction) may be changed according to a coordinate in the one direction (e.g., the X-direction) in the lens module. A boundary line of each of the first and second displacement identification layers 322*f*-1 and 322*f*-2 may be curved. Therefore, since a factor of changing inductance according to a change in magnitude of eddy current of the first displacement identification layer 322*f*-1 and a factor of changing inductance according to a change in magnitude of eddy current of the second displacement identification layer 322*f*-2 may be more efficiently and/or harmoniously integrated, the lens movement may be sensed more linearly. For example, each of the first and second displacement identification layers 322*f*-1 and 322*f*-2 may have a sinusoidal wave-shaped boundary line.

For example, each of the first and second displacement identification layers 322*f*-1 and 322*f*-2 may include any one or any combination of any two or more of copper, silver, gold, and aluminum. Since copper, silver, gold, and aluminum have relatively high conductivity, an overall magnitude of eddy current formed in the first and second displacement identification layers 322*f*-1 and 322*f*-2 according to magnetic flux of the sensing coil 322*d* may increase, and sensitivity of lens movement may be further improved.

For example, the first and second displacement identification layers 322*f*-1 and 322*f*-2 may be arranged on one surface (e.g., an upper surface, a lower surface, and an inner layer) of an identification layer support member 322*e*. Therefore, since the first and second displacement identification layers 322*f*-1 and 322*f*-2 may be separately manufactured for the lens module and then assembled in the lens module, the first and second displacement identification layers 322*f*-1 and 322*f*-2 may be implemented in a more flexible manner, and a width of each of the first and second displacement identification layers 322*f*-1 and 322*f*-2 may be implemented more accurately. For example, the first and second displacement identification layers 322*f*-1 and 322*f*-2 may be plated on one surface of the identification layer support member 322*e*, or may be adhered to the identification layer support member 322*e* by an adhesive member (e.g., an adhesive polymer), in an already manufactured state to have a plate shape for the identification layer support member 322*e*.

Referring back to FIGS. 2 and 3, the camera modules 200 and 300, according to embodiments, may include displacement identification layers 259 and 322*f*, respectively, and either one or both of identification layer support members 258 and 322*e*, and sensing coils 257 and 322*d* may be further included, respectively.

Each of the identification layer support members 258 and 322*e* may be disposed to move, according to movement of the lens modules 220 and 330, and may have one surface on which each of the displacement identification layers 259 and 322*f* is disposed. For example, each of the identification layer support members 258 and 322*e* may be formed of an insulating material (e.g., a plastic material).

First displacement identification layers 259-1 and 322*f*-1 and second displacement identification layers 259-2 and 322*f*-2, included in the displacement identification layers 259 and 322*f*, respectively, may be disposed in the lens modules 220 and 330 to move according to movement of the lens modules 220 and 330, respectively. For example, the first and second displacement identification layers 259-1 and 259-2 may move in a vertical direction according to vertical movement of the lens module 220, and the first and second displacement identification layers 322*f*-1 and 322*f*-2 may move in a horizontal direction according to horizontal movement of the lens module 330.

The sensing coil 257 may be disposed such that inductance is changed according to Z-direction movement of the first and second displacement identification layers 259-1 and 259-2 in the housing 230, and the sensing coil 322d may be disposed such that inductance is changed according to X-direction movement of the first and second displacement identification layers 322f-1 and 322f-2. For example, at least a portion of the sensing coil 257 may be disposed to overlap at least a portion of each of the first and second displacement identification layers 259-1 and 259-2 in a normal direction (e.g., the horizontal direction) of one surface of the first and second displacement identification layers 259-1 and 259-2, and at least a portion of the sensing coil 322d may be disposed to overlap at least a portion of each of the first and second displacement identification layers 322f-1 and 322f-2 in a normal direction (e.g., the Y-direction) of one surface of the first and second displacement identification layers 322f-1 and 322f-2.

Widths of portions of the first and second displacement identification layers 259-1 and 259-2 horizontally overlapping a central portion of the sensing coil 257 may be changed according to vertical movement of the first and second displacement identification layers 259-1 and 259-2. Therefore, inductance of the sensing coil 257 may be changed according to vertical movement of the lens module 220, and the vertical movement of the lens module 220 may be sensed.

Widths of portions of the first and second displacement identification layers 322f-1 and 322f-2, overlapping a central portion of the sensing coil 322d in the Y-direction, may be changed according to movement of the first and second displacement identification layers 322f-1 and 322f-2 in the X-direction. Therefore, inductance of the sensing coil 322d may be changed according to movement of the lens module 330 in the X-direction, and the movement of the lens module 330 in the X-direction may be sensed.

For example, the sensing coil 257 may include a plurality of sensing coils, and the number of sensing coils 322d may be one. The number of sensing coils 257 and 322d or an arrangement direction of the plurality of sensing coils is not limited.

For example, the arrangement direction of the sensing coil 257 may be rotated 90 degrees. Therefore, the sensing coil 257 may be composed of a plurality of sensing coils arranged such that inductance is changed according to vertical movement of a corresponding displacement identification layer, among the first and second displacement identification layers 259-1 and 259-2.

Referring to FIG. 2, the substrate 255 of the camera module 200 may be disposed in the housing 230, and may provide a space for accommodating the sensing coil 257. The magnet 251 may be disposed to move according to movement of the lens module 220. The driving coil 253 may output magnetic flux driving the magnet 251 in the housing 230, and may be disposed on a portion of the substrate 255 different from a portion of the substrate on which the sensing coil 257 is disposed. For example, a size of one of the at least one sensing coil 257 may be smaller than a size of the driving coil 253.

For example, the substrate 255 may be a printed circuit board (PCB) or a flexible printed circuit board, and may include a wiring electrically connected to the sensing coil 257. The wiring may be electrically connected to an integrated circuit that may be disposed on the substrate 255. The integrated circuit may perform analog and/or digital processing, based on inductance of the sensing coil 257, to generate motion information of the lens module 220.

Referring to FIG. 3, the camera module 300 may further include any one or any combination of any two or more of the first substrate 321c, the second substrate 322c, the first magnet 321b, the second magnet 322b, the first driving coil 321a, the second driving coil 322a, a third displacement identification layer 322f-3, a fourth displacement identification layer 322f-4, a fifth displacement identification layer 321f-1, and a sixth displacement identification layer 321f-2.

The first and second substrates 321c and 322c may correspond to the substrate 255 illustrated in FIG. 2, the first and second magnets 321b and 322b may correspond to the magnet 251 illustrated in FIG. 2, and the first and second driving coils 321a and 322a may correspond to the driving coil 253 illustrated in FIG. 2.

The third and fourth displacement identification layers 322f-3 and 322f-4 may be arranged to move according to movement of the lens module 330, and may have widths varying according to a coordinate in the second direction (e.g., Z-direction) in the lens module 330.

The third and fourth displacement identification layers 322f-3 and 322f-4 may be arranged such that a coordinate in the second direction (e.g., the Z-direction) corresponding to a maximum width of the third displacement identification layer 322f-3 is different from a coordinate in the second direction (e.g., the Z-direction) corresponding to a maximum width of the fourth displacement identification layer 322f-4.

The first and second displacement identification layers 322f-1 and 322f-2 may be arranged such that a separation distance between first and second displacement identification layers 322f-1 and 322f-2 is shorter than a separation distance from the first and second displacement identification layers 322f-1 and 322f-2 to the third and fourth displacement identification layers 322f-3 and 322f-4.

The fifth and sixth displacement identification layers 321f-1 and 321f-2 may be arranged to move according to movement of the lens module, and may have a width varying according to a coordinate in the third direction (e.g., the Y-direction) in the lens module 330 different than the first and second directions (e.g., the X and Z-directions).

The fifth and sixth displacement identification layers 321f may be arranged such that a coordinate in the third direction (e.g., the Y-direction) corresponding to a maximum width of the fifth displacement identification layer 321f-1 is different from a coordinate in the third direction (e.g., the Y-direction) corresponding to a maximum width of the sixth displacement identification layer 321f-2.

For example, one of the first, second, and third directions (e.g., the X-direction, the Z-direction, and the Y-direction) may be equal to the optical axis direction of the lens module 330, and the others of the first, second, and third directions may be perpendicular to the optical axis direction and may be perpendicular to each other. For example, inductance based on two of the first, second, third, fourth, fifth, and sixth displacement identification layers 322f-1, 322f-2, 322f-3, 322f-4, 321f-1, and 321f-2 may be used for autofocusing control, and inductance based on remaining portions of the first, second, third, fourth, fifth, and sixth displacement identification layers 322f-1, 322f-2, 322f-3, 322f-4, 321f-1, and 321f-2 may be used for optical image stabilization control.

Figure 5:
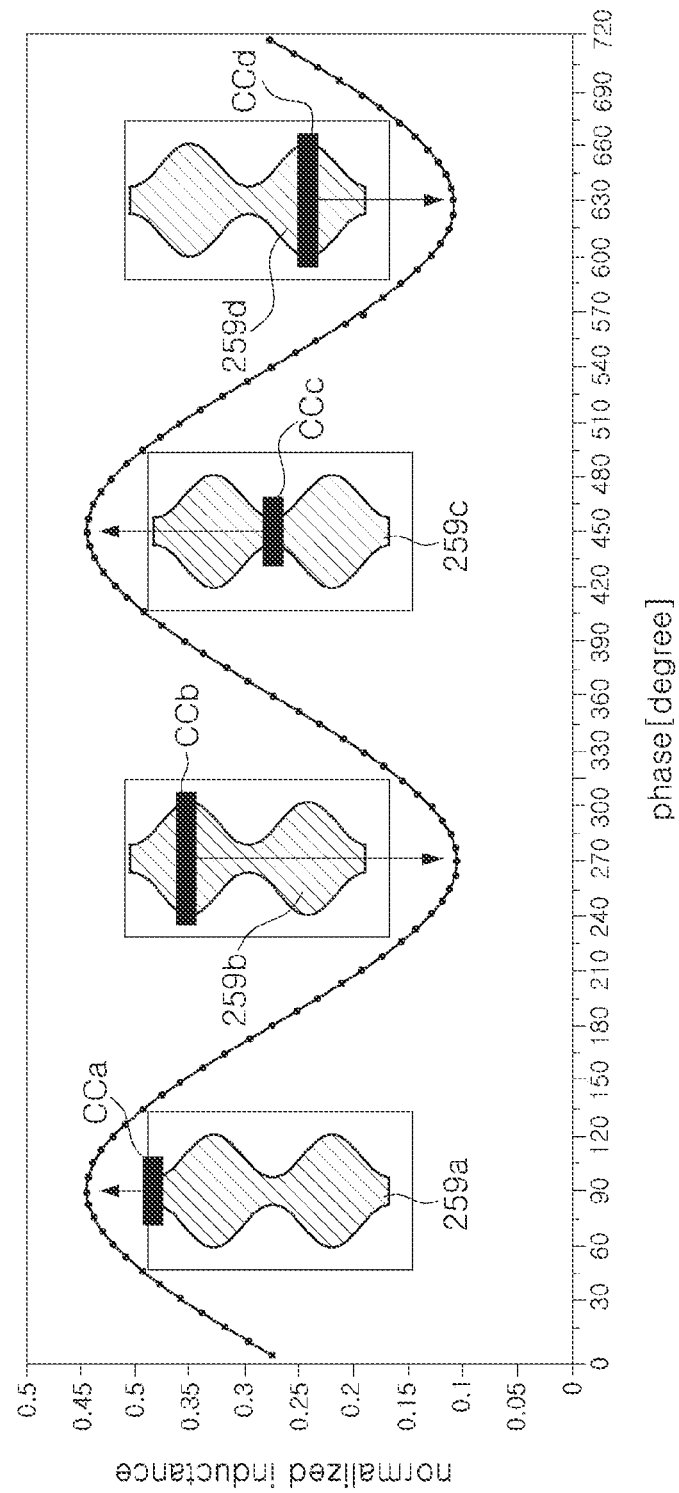
FIG. 5 is a graph illustrating inductance of a sensing coil, according to one directional movement of a lens module of a camera module, according to an embodiment.

FIG. 5 is a graph illustrating inductance of a sensing coil, according to one directional movement of a lens module of a camera module, according to an embodiment.

Referring to FIG. 5, a period of a width of a displacement identification layer 259a, 259b, 259c, or 259d may correspond to a phase of 360 degrees. Normalized inductance of the displacement identification layer 259a or 259c in which a portion CCa or CCc overlapping a central portion of a sensing coil corresponds to a minimum width, respectively, may be a maximum value, respectively, and normalized inductance of the displacement identification layer 259b or 259d in which a portion CCb or CCd overlapping the central portion of the sensing coil corresponds to a maximum width, respectively, may be a minimum value, respectively. In this case, the normalization may be a value to which a specific weight is applied to inductance of each of the displacement identification layers 259a, 259b, 259c, and 259d.

Figure 6A:
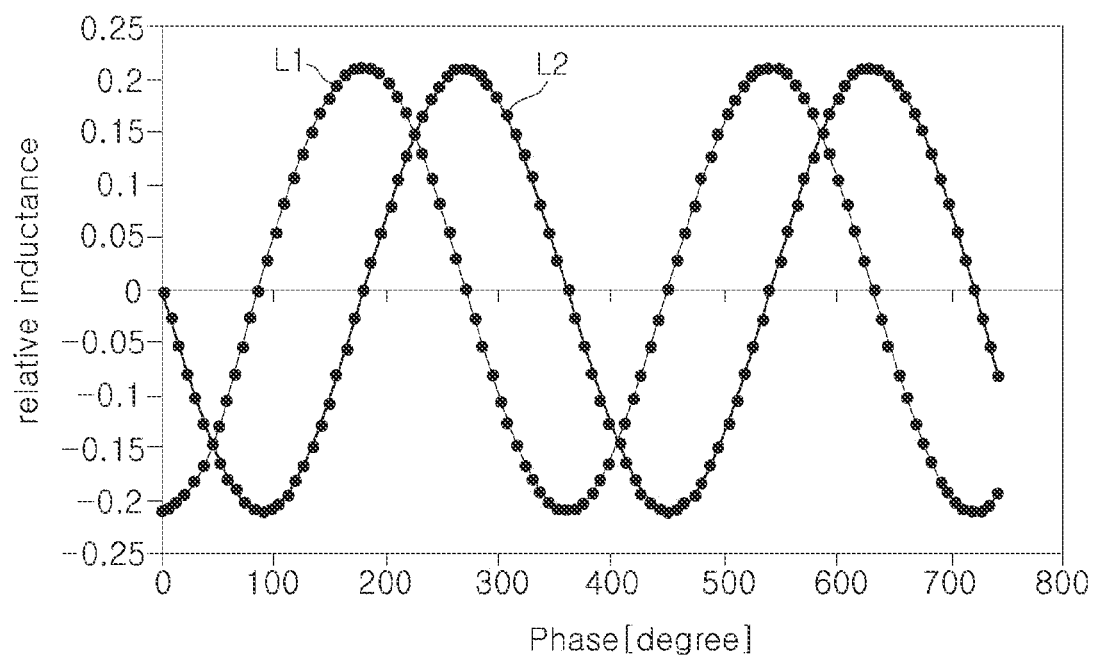
FIG. 6A is a graph illustrating a plurality of inductances of a plurality of sensing coils respectively corresponding to first and second displacement identification layers of a camera module, according to an embodiment.

FIG. 6A is a graph illustrating a plurality of inductances of a plurality of sensing coils respectively corresponding to first and second displacement identification layers of a camera module, according to an embodiment.

Referring to FIG. 6A, a phase difference between first relative inductance L1 of a sensing coil corresponding to a first displacement identification layer, among a plurality of sensing coils, and second relative inductance L2 of a sensing coil corresponding to a second displacement identification layer, among the plurality of sensing coils, may be 90 degrees. In this case, the relative inductance may be a value obtained by subtracting a specific value such that an average value becomes 0, in normalized inductance.

Figure 6B:
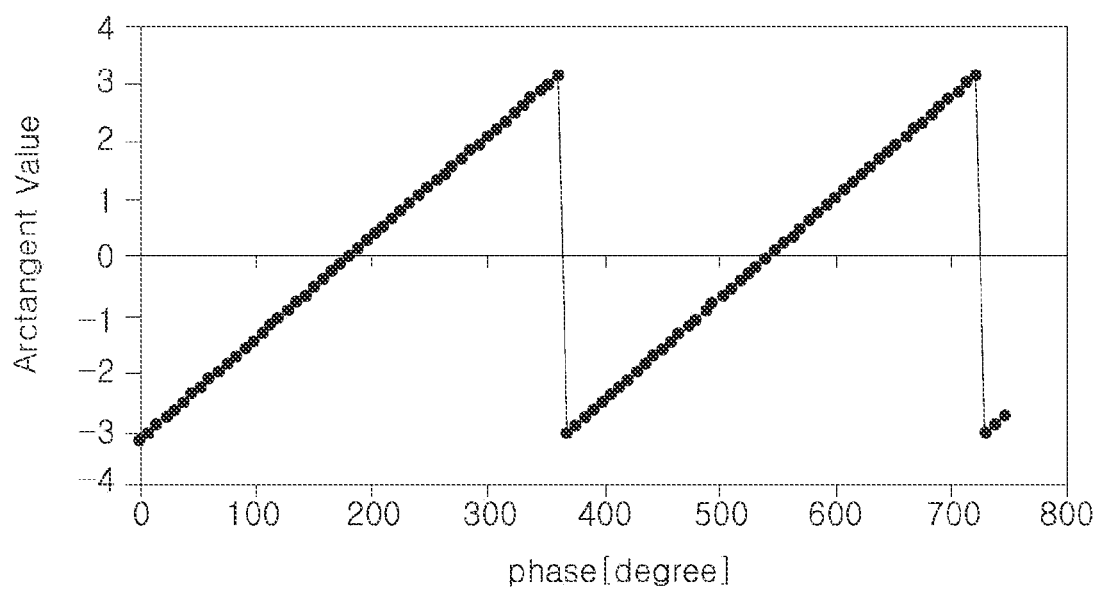
FIG. 6B is a graph illustrating arctangent processing values of the plurality of inductances illustrated in FIG. 6A.

FIG. 6B is a graph illustrating arctangent processing values of the plurality of inductances illustrated in FIG. 6A.

Referring to FIG. 6B, arctangent processing values may be linearly changed, depending on a change in phase.

When first and second inductances of a plurality of sensing coils form a phase difference of 90 degrees from each other, one of the first and second inductances may correspond to {sin(phase)} and the other thereof may correspond to {cos(phase)}.

In a trigonometric function model, an angle ranging from the origin to one point of a circle may correspond to a phase of a period of a displacement identification layer, a distance from the origin to the one point of the circle may be r, and an X-direction vector value and a Y-direction vector value for a range from the origin to the one point of the circle may be x and y, respectively. {sin(phase)} may be (y/r), and {cos(phase)} may be (x/r). {tan(phase)} may be (y/x), {sin(phase)}/{cos(phase)}, and (second inductance)/(first inductance). Therefore, arctan{(second inductance)/(first inductance)} may correspond to a phase of a period of the displacement identification layer, and may be an arctangent processing value.

According to embodiments disclosed herein, movement of a lens module may be detected more stably, accurately, linearly, and/or efficiently.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
    a lens module including a lens and movably disposed in a housing;
    a first displacement identification layer disposed on the lens module, configured to move according to movement of the lens module, and having a width varying according to coordinates in one direction in the lens module; and
    a second displacement identification layer disposed on the lens module, configured to move according to the movement of the lens module, and having a width varying according to the coordinates in the one direction in the lens module,
    wherein the first and second displacement identification layers are arranged such that a coordinate, among the coordinates in the one direction, corresponding to a maximum width of the first displacement identification layer is different from a coordinate, among the coordinates in the one direction in the lens module, corresponding to a maximum width of the second displacement identification layer.

2. The camera module of claim 1, wherein one of the first and second displacement identification layers has a plurality of maximum widths corresponding to different coordinates among the coordinates in the one direction in the lens module,
    wherein a difference between the coordinate corresponding to the maximum width of the first displacement identification layer and the coordinate corresponding to the maximum width of the second displacement identification layer is more than $\frac{1}{8}$ times and less than $\frac{3}{8}$ times a difference between coordinates in the one direction in the lens module corresponding to the plurality of maximum widths of the one of the first and second displacement identification layers.

3. The camera module of claim 2, wherein a length of the first displacement identification layer is one cycle or more in a period of the width of the first displacement identification layer, and
    a length of the second displacement identification layer is one cycle or more in a period of the width of the second displacement identification layer.

4. The camera module of claim 3, wherein a shape of the first displacement identification layer is identical to a shape of the second displacement identification layer, and
    wherein the difference between the coordinate corresponding to the maximum width of the first displacement identification layer and the coordinate corresponding to the maximum width of the second displacement identification layer is $\frac{1}{4}$ times a period of the width of the first displacement identification layer.

5. The camera module of claim 3, wherein each of the first and second displacement identification layers has a sinusoidal wave-shaped boundary line.

6. The camera module of claim 1, wherein a change rate of a width of each of the first and second displacement identification layers according to the coordinates in the one direction changes according to the coordinates in the one direction in the lens module.

7. The camera module of claim 1, wherein each of the first and second displacement identification layers comprises any one or any combination of any two or more of copper, silver, gold, and aluminum.

8. The camera module of claim 1, further comprising an identification layer support member disposed to move according to the movement of the lens module and having one surface on which the first and second displacement identification layers are disposed.

9. The camera module of claim 1, further comprising a plurality of sensing coils arranged such that inductance is changed according to movement of a corresponding displacement identification layer, among the first and second displacement identification layers, in the one direction.

10. The camera module of claim 1, further comprising at least one sensing coil arranged such that inductance is changed according to movement of the first and second displacement identification layers in the one direction, in the housing,
wherein at least a portion of the at least one sensing coil is disposed to overlap at least a portion of each of the first and second displacement identification layers in a normal direction of one surface of the first and second displacement identification layers.

11. The camera module of claim 10, further comprising:
a substrate disposed in the housing, the at least one sensing coil being disposed on the substrate;
a magnet disposed to move according to the movement of the lens module; and
a driving coil configured to output a magnetic flux driving the magnet in the housing, and disposed on a portion of the substrate different from a portion of the substrate on which the at least one sensing coil is disposed.

12. The camera module of claim 11, wherein a size of one sensing coil among the at least one sensing coil is smaller than a size of the driving coil.

13. The camera module of claim 1, further comprising:
a third displacement identification layer disposed on the lens module, configured to move according to the movement of the lens module, and having a width varying according to coordinates in a second direction in the lens module; and
a fourth displacement identification layer disposed on the lens module, configured to move according to the movement of the lens module, and having a width varying according to the coordinates in the second direction in the lens module,
wherein the third and fourth displacement identification layers are arranged such that a coordinate, among the coordinates in the second direction, corresponding to a maximum width of the third displacement identification layer is different from a coordinate, among the coordinates in the second direction, corresponding to a maximum width of the fourth displacement identification layer, and
wherein the one direction is a first direction different from the second direction.

14. The camera module of claim 13, further comprising:
a fifth displacement identification layer disposed on the lens module, configured to move according to the movement of the lens module, and having a width varying according to coordinates in a third direction different from the first and second directions in the lens module; and
a sixth displacement identification layer disposed on the lens module, configured to move according to movement of the lens module, and having a width varying according to the coordinates in the third direction in the lens module,
wherein the fifth and sixth displacement identification layers are arranged such that a coordinate, among the coordinates in the third direction, corresponding to a maximum width of the fifth displacement identification layer is different from a coordinate, among the coordinates in the third direction, corresponding to a maximum width of the sixth displacement identification layer.

15. The camera module of claim 14, wherein one of the first, second, and third directions is an optical axis direction of the lens module, and others of the first, second, and third directions are perpendicular to the optical axis direction and perpendicular to each other.

16. The camera module of claim 13, wherein the first and second displacement identification layers are arranged such that a separation distance between the first and second displacement identification layers is shorter than a separation distance from the first and second displacement identification layers to the third and fourth displacement identification layers.

17. A camera module comprising:
a frame;
a lens barrel disposed in the frame;
a first displacement identification layer disposed on the frame and having a width varying along one direction; and
a second displacement identification layer disposed on the frame and having a width varying along the one direction differently than the width of the first displacement identification layer varies along the one direction.

18. The camera module of claim 17, wherein the first and second displacement identification layers are arranged such that a maximum width of the first displacement identification layer and a maximum width of the second displacement identification layer are disposed at different respective positions in the one direction.

19. The camera module of claim 17, wherein each of the first and second displacement identification layers has a wave-shaped boundary line extending in the one direction.

20. The camera module of claim 17, wherein the first and second displacement identification layers are arranged such that a minimum width of the first displacement identification layer and a minimum width of the second displacement identification layer are disposed at different respective positions in the one direction.

21. The camera module of claim 17, wherein the one direction is a direction parallel to an optical axis of the lens barrel, or a direction perpendicular to the optical axis.

22. The camera module of claim 17, wherein the first and second displacement identification layers are configured to change an inductance of at least one sensing coil based on movement of the first and second displacement identification layers.

* * * * *